US012354419B2

(12) United States Patent
Okamoto et al.

(10) Patent No.: US 12,354,419 B2
(45) Date of Patent: Jul. 8, 2025

(54) ABNORMAL NOISE DIAGNOSIS SUPPORT SYSTEM

(71) Applicant: TOYOTA JIDOSHA KABUSHIKI KAISHA, Toyota (JP)

(72) Inventors: Hiroyuki Okamoto, Toyota (JP); Masaya Tagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 18/215,536

(22) Filed: Jun. 28, 2023

(65) Prior Publication Data

US 2024/0013596 A1 Jan. 11, 2024

(30) Foreign Application Priority Data

Jul. 5, 2022 (JP) ................................ 2022-108471

(51) Int. Cl.
*G07C 5/08* (2006.01)

(52) U.S. Cl.
CPC ......... *G07C 5/0825* (2013.01); *G07C 5/0808* (2013.01); *G07C 5/0833* (2013.01); *G07C 5/085* (2013.01)

(58) Field of Classification Search
CPC .. G07C 5/0825; G07C 5/0808; G07C 5/0833; G07C 5/085; G10L 25/51; G10L 25/03; G10L 25/27
See application file for complete search history.

(56) References Cited

U.S. PATENT DOCUMENTS

| | | | | |
|---|---|---|---|---|
| 6,493,615 | B1 * | 12/2002 | Johnston ............ | G05B 23/0227 340/460 |
| 10,395,670 | B1 | 8/2019 | Nonaka et al. | |
| 2016/0048811 | A1 | 2/2016 | Asai et al. | |
| 2021/0370904 | A1 | 12/2021 | Seo et al. | |

FOREIGN PATENT DOCUMENTS

| | | | |
|---|---|---|---|
| JP | 2000-141138 | A | 5/2000 |
| JP | 2002-331884 | A | 11/2002 |
| JP | 2010-197361 | A | 9/2010 |
| JP | 2013-015468 | A | 1/2013 |
| JP | 2014-191790 | A | 10/2014 |
| JP | 2019-144187 | A | 8/2019 |

* cited by examiner

*Primary Examiner* — Michael V Kerrigan
(74) *Attorney, Agent, or Firm* — Dinsmore & Shohl LLP

(57) ABSTRACT

The abnormal noise diagnosis support system includes an acquisition module and a processing module. The acquisition module is configured to acquire a plurality of assumed locations of the abnormal noise in the diagnosis target vehicle, at least one assumed abnormal noise at each of the assumed locations, and an assumed frequency of the abnormal noise at each of the assumed locations. The processing module is programmed to superimpose the assumed frequency for each of the assumed locations on an image of the diagnosis target vehicle and to cause a display module to display the superimposed image. And the processing module is programmed to play back the assumed abnormal noise corresponding to the selected assumed location and to cause a noise output module to output the assumed abnormal noise played back when the user selects any one of the assumed locations.

6 Claims, 3 Drawing Sheets

ABNORMAL NOISE DIAGNOSIS SUPPORT SYSTEM

CROSS-REFERENCE TO RELATED APPLICATIONS

The present disclosure claims priority to Japanese Patent Application No. 2022-108471 filed Jul. 5, 2022, which is incorporated herein by reference in its entirety including specification, drawings and claims.

TECHNICAL FIELD

This disclosure relates to an abnormal noise diagnosis support system.

BACKGROUND

Conventionally, a proposed abnormal noise diagnosis support system causes a display module to display a plurality of scene selection buttons and a plurality of symptom selection buttons, and when a problem symptom is related to an abnormal noise in a diagnosis target vehicle, the system causes the display module to display a sample abnormal noise output button in addition to the symptom selection buttons (see, for example, Japanese Patent Application Laid Open No. 2014-191790). The scene selection button is a button that requests selection of the driving operation scene in which the malfunction symptom occurred. The multiple symptom selection buttons are buttons for requesting the selection of the content of the failure symptom associated with the selection result of the plurality of scene selection buttons. The sample abnormal noise output button is a button for instructing the output of a sample abnormal noise corresponding to the failure symptom.

SUMMARY

In the abnormal noise diagnosis support system described above, the user may not be able to identify the location where abnormal noises occur frequently (i.e., where abnormal noises are likely to occur) in the diagnosis target vehicle. In this case, the user may have difficulty in searching for an assumed abnormal noise similar to the abnormal noise occurred in the diagnosis target vehicle among the plurality of assumed abnormal noises (plurality of sample abnormal noises) in the diagnosis target vehicle.

The main object of the abnormal noise diagnosis support system is to more fully assist the user in searching for the assumed abnormal noise similar to the abnormal noise occurred in the diagnosis target vehicle among the plurality of assumed abnormal noises in the diagnosis target vehicle.

The abnormal noise diagnosis support system employs the following configuration in order to achieve the above main object.

[1] The abnormal noise diagnosis support system is configured to assist a user in diagnosing an abnormal noise of a diagnosis target vehicle. The system includes an acquisition module and a processing module. The acquisition module is configured to acquire a plurality of assumed locations of the abnormal noise in the diagnosis target vehicle, at least one assumed abnormal noise at each of the assumed locations, and an assumed frequency of the abnormal noise at each of the assumed locations. The processing module is programmed to superimpose the assumed frequency for each of the assumed locations on an image of the diagnosis target vehicle and to cause a display module to display the superimposed image. And the processing module is programmed to play back the assumed abnormal noise corresponding to the selected assumed location and to cause a noise output module to output the assumed abnormal noise played back when the user selects any one of the assumed locations.

The abnormal noise diagnosis support system includes the acquisition module and the processing module. The acquisition module acquires the plurality of assumed locations of the abnormal noise in the diagnosis target vehicle, at least one assumed abnormal noise at each of the assumed locations, and the assumed frequency of the abnormal noise at each of the assumed locations. The processing module superimposes the assumed frequency for each of the assumed locations on the image of the diagnosis target vehicle and to cause the display module to display the superimposed image. And the processing module plays back the assumed abnormal noise corresponding to the selected assumed location and to cause the noise output module to output the assumed abnormal noise played back when the user selects any one of the assumed locations. The user of this abnormal noise diagnosis support system first listens to the abnormal noise (raw abnormal noise) occurred in the diagnosis target vehicle to roughly understand the location of the abnormal noise. The user then selects the assumed location around the location of the abnormal noise, among the plurality of assumed locations displayed on the display module. At this time, the display module displays not only the plurality of assumed locations, but also the assumed frequency of abnormal noise (ease of occurrence of abnormal noise) at each assumed location. Thus, the user can select the assumed location for playback of the assumed abnormal noise (playback assumed location) with reference to the assumed frequency. The user then listens to the assumed abnormal noise played back (the assumed abnormal noise corresponding to the playback assumed location) and determines whether the abnormal noise occurred in the diagnosis target vehicle and the assumed abnormal noise played back are similar to each other or not. In this way, the user can search for the assumed abnormal noise that is similar to the noise that is occurred in the diagnosis target vehicle. As described above, the user can select the playback assumed location with reference to the assumed frequency. This facilitates the user's search for the assumed abnormal noise that is similar to the noise occurred in the diagnosis target vehicle (similar assumed abnormal noise). In other words, the abnormal noise diagnosis support system can more fully assist the user in searching for the similar assumed abnormal noise. Then, once the user obtains the cause of the abnormal noise and/or the method of dealing with the abnormal noise, corresponding to the similar assumed abnormal noise, the user can obtain the cause of the abnormal noise and/or the method of dealing with the abnormal noise, corresponding to the abnormal noise that is occurred in the diagnosis target vehicle.

[2] In the abnormal noise diagnosis support system described above (the abnormal noise diagnosis support system described in [1]), the assumed abnormal noise of the diagnosis target vehicle may be the abnormal noise obtained by filter processing on a previously detected abnormal noise previously detected in a diagnosis target same type, which has the same vehicle type and powertrain type as the diagnosis target vehicle. Here, the filter processing may be a process using a filter that emphasizes the predetermined frequency band (and attenuates the frequencies outside the predetermined frequency band). The predetermined frequency band may, for example, be a frequency band that facilitates recognition of abnormal noise by the user.

[3] In this case (the abnormal noise diagnosis support system described in [2]), when the user determines that the abnormal noise occurred in the diagnosis target vehicle and the assumed abnormal noise played back are similar to each other, the processing module may be programmed to cause the display module to display a cause of the abnormal noise and/or a method of dealing with the abnormal noise, corresponding to the assumed abnormal noise played back. In this way, the user can understand the cause of the abnormal noise and/or the method of dealing with the abnormal noise that occurs in the diagnosis target vehicle, based on the cause of the abnormal noise and/or the method of dealing with the abnormal noise, corresponding to the assumed abnormal noise played back.

[4] Also, in this case (the abnormal noise diagnosis support system described in [2]), the abnormal noise diagnosis support system further may include a recording module configured to record sounds as recorded sounds, for each part of the diagnosis target vehicle. And when the user selects any one of the assumed abnormal noises, the processing module may be programmed to generate a filtered noise by applying the same filter processing as that applied in generating the selected assumed abnormal noise to the recorded sound of the same assumed location corresponding to the selected assumed abnormal noise among the various locations in the diagnosis target vehicle, to play back the filtered noise, and to cause the noise output module to output the filtered noise played back. In this way, the user can compare the filtered noise with the assumed abnormal noise selected by the user and determine whether they are similar to each other or not. The filtered noise and the assumed abnormal noise selected by the user are subjected to the same filter processing when each is occurred. The user can more easily determine whether they are similar to each other or not.

[5] In this case (the abnormal noise diagnosis support system described in [4]), when the user determines that the filtered noise and the selected assumed abnormal noise are similar to each other, the processing module may be programmed to cause the display module to display the cause of the abnormal noise and/or the method of dealing with the abnormal noise, corresponding to the selected assumed abnormal noise. In this way, the user can understand the cause of the abnormal noise and/or the method of dealing with the abnormal noise that occurs in the diagnosis target vehicle, based on the cause of the abnormal noise and/or the method of dealing with the abnormal noise, corresponding to the selected assumed abnormal noise.

[6] In the abnormal noise diagnosis support system described above (the abnormal noise diagnosis support system described in any one of [1] to [5]), the abnormal noise diagnosis support system further may include a recording module configured to record sounds as recorded sounds for each part of the diagnosis target vehicle. And the processing module may be programmed to estimate the location of occurrence of the abnormal noise in the diagnosis target vehicle by artificial intelligence based on the recorded sound for each part in the diagnosis target vehicle, to cause the display module to display the assumed frequency at the assumed location around the estimated location of occurrence of the abnormal noise. In this case, "around the location of occurrence" may be within a predetermined range centered on the location of occurrence.

DESCRIPTION OF EMBODIMENTS

The following is a description of embodiments of present embodiments with examples.

Figure 1:
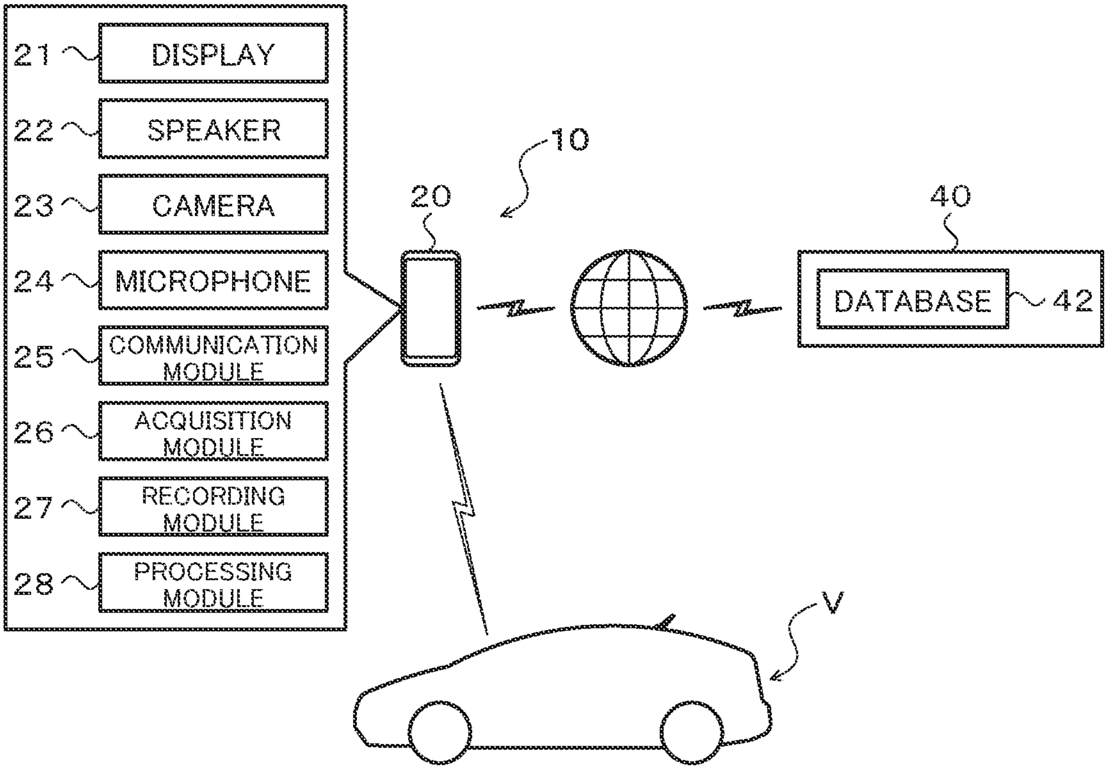
FIG. 1 is a schematic diagram of the configuration of the abnormal noise diagnosis support system as an example of the present disclosure.

FIG. 1 is a schematic diagram of the configuration of an abnormal noise diagnosis support system as an example. The abnormal noise diagnosis support system 10 in the embodiment is a system for supporting abnormal noise diagnosis of the diagnosis target vehicle V, and includes a portable terminal 20 capable of communicating with a server 40. The types of the diagnosis target vehicles V include, for example, engine vehicles, hybrid electric vehicles, battery electric vehicles, and fuel cell electric vehicles. An engine vehicle includes only an engine as a power source. Hybrid electric vehicles include both the engine and a motor as the power source. Electric and fuel cell electric vehicles include only the motor as the power source. The server 40 is described below, followed by a description of the portable terminal 20.

The server 40 is configured as a well-known computer and has a CPU, ROM, RAM, auxiliary memory (e.g., flash memory), main memory (e.g., HDD or SSD), and communication modules. The main memory stores a database 42. The database 42 stores a plurality of assumed locations of the abnormal noise, sound file of assumed abnormal noise and a list of the sound files, and assumed frequencies in relation to each other for each vehicle type and each powertrain type. Assumed locations are the locations where abnormal noise is assumed to occur. In the embodiment, the assumed location is set to the location where abnormal noise was detected previously. In the embodiment, the assumed location is set to the location where abnormal noise was detected in the past. The assumed abnormal noise is the abnormal noise assumed to occur at the corresponding assumed location. In the embodiment, the sound file for the assumed abnormal noise is occurred by the filter processing for the abnormal noise previously detected at the corresponding assumed location (hereinafter referred to as "previously detected abnormal noise"). Here, the filter processing is a process using a frequency filter that emphasizes a predetermined frequency band (and attenuates the frequencies outside the predetermined frequency band). The predetermined frequency band is, for example, a frequency band that facilitates recognition of abnormal noise by the user. The filter processing (frequency filter) may be different for the previously detected abnormal noise, or may be the same regardless of the previously detected abnormal noise. For each assumed location, the number of sound files for each assumed abnormal noise is the number corresponding to the assumed frequency (e.g., the number of previously detected abnormal noises). The number of sound files for the assumed abnormal noise may be one or more. The assumed frequency is the frequency of the abnormal noise at the corresponding assumed location (i.e., the likelihood of the abnormal noise occurring). In the embodiment, the assumed frequency is the cumulative number of times or the number of times per unit period that the abnormal noise has been previously detected at the corresponding assumed location. The database 42 also stores, by vehicle type and by powertrain type, the sound file of the assumed abnormal noise in association with the cause of the abnormal noise and/or the method of dealing with the abnormal noise (method of eliminating the abnormal noise).

The portable terminal 20 is used by operators (users of the abnormal noise diagnosis support system 10) at vehicle dealerships and maintenance shops to reproduce abnormal noise using the diagnosis target vehicle V that has occurred abnormal noise. The portable terminal 20 is, for example, a smartphone or tablet terminal, and includes a SoC with a CPU and a GPU, a ROM, a RAM, an auxiliary memory (flash memory), a display (display module) 21, a speaker (sound output module) 22, a camera 23, a microphone 24, and a communication module 25. The display 21 is configured as a touch panel type display and displays an information. The speaker 22 outputs sound. The camera 23 captures images of the surroundings. The microphone 24 collects surrounding sounds. The communication module 25 exchanges various information with the electronic controller of the diagnosis target vehicle V via short-range wireless communication, or with the server 40 via a network such as the Internet.

The portable terminal 20 has an abnormal noise diagnosis support application (software) installed. The portable terminal 20 includes an acquisition module 26, a recording module (recording section) 27, and a processing module 28. The acquisition module 26, the recording module 27, and the processing module 28 are configured by the collaboration of the abnormal noise diagnosis support application (software) and hardware such as the SoC, the ROM, the RAM, the display 21, the speaker 22, the camera 23, the microphone 24, and the communication module 25, respectively. The acquisition module 26 acquires various information from the diagnosis target vehicle V and the server 40. The recording module 27 performs recording. Specifically, the recording module 27 records images and sounds as recorded images and recorded sounds. The processing module 28 performs various processing and controls the display 21.

Figure 2:
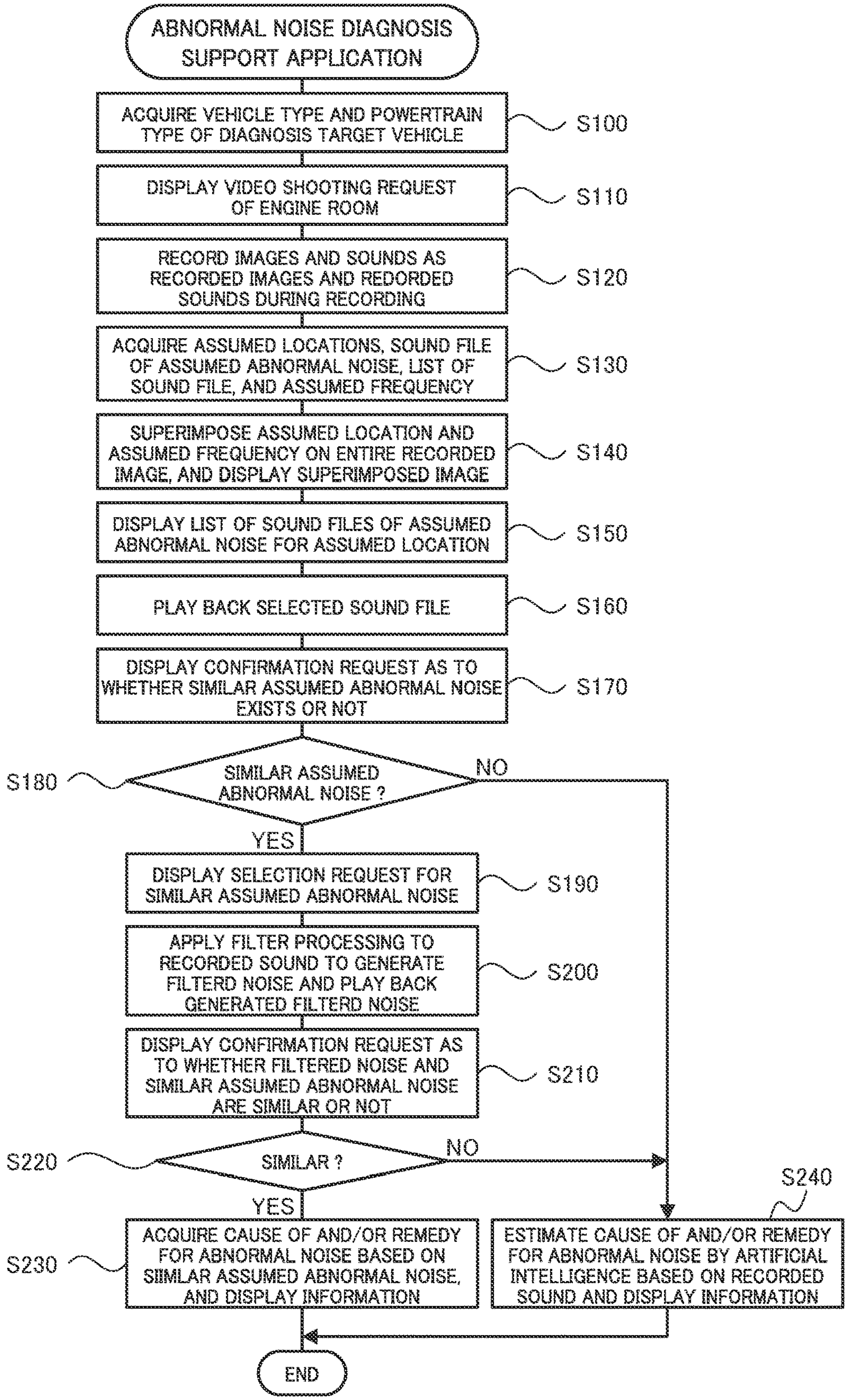
FIG. 2 is a flowchart showing an example of each process of the abnormal noise diagnosis support application.

Next, the procedure for diagnosing abnormal noise using the abnormal noise diagnosis support system 10 is described. When an operator (user of the abnormal noise diagnosis support system 10) at a vehicle dealership or maintenance shop receives a request from the owner of the diagnosis target vehicle V to identify the cause of abnormal noise or to eliminate abnormal noise, said operator places each wheel of the diagnosis target vehicle V on the rollers of the chassis dynamometer and operates each wheel together with the rollers. The operator may activate the diagnosis target vehicle V while the vehicle is parked. The operator also starts the abnormal noise diagnosis support application on the portable terminal 20. FIG. 2 is a flowchart showing an example of each process of the abnormal noise diagnosis support application.

In the abnormal noise diagnosis support application shown in FIG. 2, first, the acquisition module 26 of the portable terminal 20 acquires vehicle information such as the vehicle type, powertrain type, and vehicle identification number of the diagnosis target vehicle V from the electronic control unit of the diagnosis target vehicle V (step S100). The vehicle information may be input from a dongle in which information on the diagnosis target vehicle V is stored. The vehicle information may be input into the portable terminal 20 by the operator.

Figure 3:
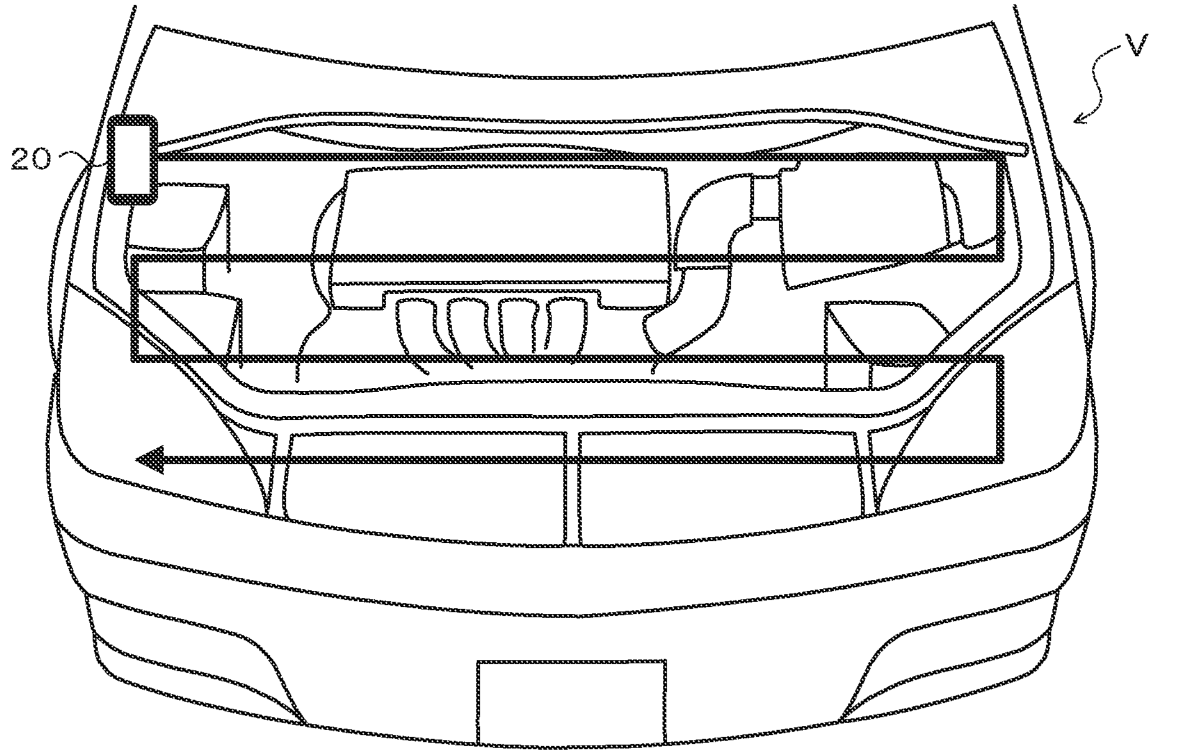
FIG. 3 is an illustration showing an example of how an operator photographs the engine room of a diagnosis target vehicle.

The processing module 28 of the portable terminal 20 then causes the display 21 to display a video shooting request of the engine room (housing the power source and other components) of the diagnosis target vehicle V, a video shooting button (step S110). FIG. 3 illustrates an example of when the operator performs video shooting of the engine room of the diagnosis target vehicle V. In the case of the engine vehicle, the engine room houses the engine, alternator, battery, radiator, coolant tank (radiator tank), brake fluid tank (brake oil tank), washer fluid tank, fuse box, and so on. First, the operator taps the movie shooting button on the display 21. Then, the operator performs video shooting for each part (area) of the engine room of the diagnosis target vehicle V while moving the portable terminal 20 slowly at a constant speed, for example, as shown by the arrow in FIG. 3. The operator then taps the video shooting stop button on the display 21. The recording module 27 of the portable terminal 20 records images and sounds for each part of the engine room of the diagnosis target vehicle V as recorded images and recorded sounds during video shooting, that is, from the time the video shooting button is tapped until the video shooting stop button is tapped by the operator (step S120).

Then, the processing module 28 acquires the information on the diagnosis target same type that has the same vehicle type and powertrain type as the diagnosis target vehicle V from the database 42 of the server 40 (step S130). The diagnosis target same type information includes the plurality of assumed locations of the abnormal noise, the sound file for at least one assumed abnormal noise at each assumed location and the list of the sound files, and the assumed frequency of the abnormal noise at each assumed location.

Figure 4:
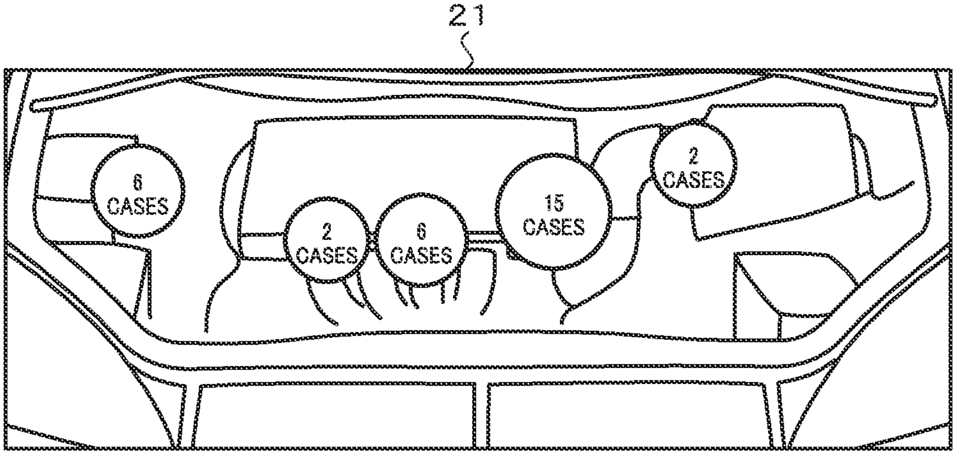
FIG. 4 is an illustration showing an example of an image displayed on the display module.

When the processing module 28 acquires the information on the diagnosis target same type, the processing module 28 superimposes the assumed frequency of the abnormal noise for each of the assumed locations of the diagnosis target same type on the recorded image of the entire engine room of the diagnosis target vehicle V and causes the display 21 to display the superimposed image (step S140). FIG. 4 shows an example of the image displayed on the display 21 in this process.

When the operator taps (selects) any one of the assumed locations, the processing module 28 causes the display 21 to display the list of the sound files of the assumed abnormal noise for that assumed location (step S150) When the operator taps (selects) any one of the sound files for the assumed abnormal noise, the processing module 28 plays back the selected sound file for the assumed abnormal noise and causes the speaker 22 to output sound of the selected sound file (step S160). The number of times steps S150 and S160 are performed is not limited to once, but may be performed multiple times, depending on the operator's operation.

The operation of the operator during the process of steps S120 to S160 is described below. The operator listens to the abnormal noise (raw abnormal noise) occurred in the diagnosis target vehicle V while video shooting each part of the engine room of the diagnosis target vehicle V using the portable terminal 20, and roughly grasps the site where the abnormal noise is occurred. Then, the operator selects an assumed location around the location of occurrence from the plurality of assumed locations displayed on the display 21, and listens to at least one assumed abnormal noise at the selected assumed location. At this time, the display 21 displays not only the plurality of assumed locations, but also the assumed frequency of the abnormal noise (ease of occurrence of the abnormal noise) for each assumed location. The operator can therefore select the assumed location for playing the assumed abnormal noise (hereinafter referred to as "playback assumed location") by referring to the assumed frequency. This facilitates the operator's selection of the playback assumed location. The operator can then easily search for the assumed abnormal noise similar to the abnormal noise occurred in the diagnosis target vehicle V (hereinafter referred to as "similar assumed abnormal noise").

The processing module 28 then causes the display 21 to display a confirmation request as to whether there is at least one similar assumed abnormal noise among the one or more assumed abnormal noises played back or not (step S170). When the operator decides that there are no similar assumed abnormal noise and taps (selects) a button indicating that fact, the processing module 28 recognizes that fact (step S180). In this case, the processing module 28 estimates the cause of the abnormal noise and/or the method of dealing with the abnormal noise (method of eliminating the abnormal noise) by artificial intelligence (AI) based on the recorded sound for each part of the engine room of the diagnosis target vehicle V, and causes the display 21 to display the information (step S240). Then, this routine is terminated. The process of step S240 is performed, for example, as follows. The acquisition module 26 acquires a learned model from the server 40. Here, the learned model is a model that associates the sound of each part of the engine room of the diagnosis target same type with the cause of the abnormal noise and/or the method of dealing with the abnormal noise. The artificial intelligence applies the recorded sound for each location to the learned model to estimate the cause of the abnormal noise and/or the method of dealing with the abnormal noise.

After the processing of step S170, when the operator decides that there is at least one similar assumed abnormal noise and taps (selects) a button indicating that fact, the processing module 28 recognizes that fact (step S180). In this case, the processing module 28 causes the display 21 to display a selection request for the similar assumed abnormal noise (step S190). In this case, for example, the processing module 28 causes the display 21 to display a list of the assumed abnormal noise played backs. From the list, the operator taps (selects) a sound file of the assumed abnormal noise that the operator determines to be similar to the abnormal noise occurred in the diagnosis target vehicle V. In this way, the portable terminal 20 can assist the operator in selecting similar assumed abnormal noise.

When the operator selects the similar assumed abnormal noise, the processing module 28 applies a predetermined filter processing to the recorded sound of a predetermined location in the engine room of the diagnosis target vehicle V to generate a filtered noise, and plays back the generated filtered noise to cause the speaker 22 to output it (step S200). Here, the predetermined location is the location in the engine room of the diagnosis target vehicle V that is the same as the assumed location corresponding to the similar assumed abnormal noise in the diagnosis target same type. The predetermined filter processing is the filter processing that is the same as the filter processing applied to generate the similar assumed abnormal noise in the diagnosis target same type.

The processing module 28 then causes the display 21 to display a confirmation request as to whether the filtered noise and the similar assumed abnormal noise are similar to each other or not (step S210). When the operator determines that the filtered noise and the similar assumed abnormal noise are similar to each other and taps (selects) a button indicating that fact, the processing module 28 recognizes that fact (step S220). In this case, the processing module 28 acquires the cause of the abnormal noise and/or the method of dealing with the abnormal noise, corresponding to the sound file of the similar assumed abnormal noise in the diagnosis target same type from the database 42 of the server 40 and causes the display 21 to display the information (step S230). Then, this routine is terminated. This allows the operator to understand the cause of the abnormal noise and/or the method of dealing with the abnormal noise occurred in the diagnosis target vehicle V based on the cause of the abnormal noise and/or the method of dealing with the abnormal noise, corresponding to the sound file of the similar assumed abnormal noise.

In the embodiment, the processing of step S170 allows the operator to compare the abnormal noise (raw abnormal noise) occurred in the diagnosis target vehicle V with the assumed abnormal noise to determine whether they are similar to each other, and to search for the assumed abnormal noise (similar assumed abnormal noise) that is similar to the abnormal noise occurred in the diagnosis target vehicle V. Then, the processing of step S210 allows the operator to compare the filtered noise with the assumed abnormal noise (similar assumed abnormal noise) to determine whether they are similar to each other or not. The filtered noise and similar assumed abnormal noise are processed with the same filtering process when each is occurred. This allows the operator to more easily determine whether the two are similar to each other or not.

When the processing module 28 estimates the cause of the abnormal noise and/or the method of dealing with the abnormal noise by the artificial intelligence based on the recorded images and recorded sounds for each part of the engine room of the diagnosis target vehicle V, the operator may feel distrustful of the estimation results due to the reason that he/she cannot understand the estimation method of the cause of the abnormal noise and/or the method of dealing with the abnormal noise. The operator may also feel distrustful of the estimation accuracy of the artificial intelligence when the estimation result estimated based on preconceptions or past experience differs from the estimation result estimated by the artificial intelligence. In contrast to these cases, in the embodiment, the operator determines whether the abnormal noise (raw abnormal noise) occurred in the diagnosis target vehicle V is similar to the assumed abnormal noise or not, and whether the filtered noise is similar to the assumed abnormal noise (similar assumed abnormal noise) or not, and the processing module 28 causes the display 21 to display the cause of the abnormal noise and/or the method of dealing with the abnormal noise, corresponding to the sound file of the similar assumed abnormal noise. As a result, the operator is more likely to be convinced by the cause of the abnormal noise and/or the method of dealing with the abnormal noise displayed on the display 21.

In the embodiment, when the operator determines after the processing of step S210 that the filtered noise and the similar assumed abnormal noise are similar to each other, the processing module 28 sets the sound file of that filtered noise to the sound file of the assumed abnormal noise. In addition, the processing module 28 associates this sound file with the assumed location and the cause of the abnormal noise and/or the method of dealing with the abnormal noise and transmits them to the server 40. The server 40 stores the assumed location, the sound file of the assumed abnormal noise, and the cause of the abnormal noise and/or the method of dealing with the abnormal noise from the portable terminal 20 in the database 42. The server 40 also updates the assumed frequency of the assumed abnormal noise for the corresponding assumed location. In this way, the information is stored in the database 42.

After the processing of step S220, when the operator determines that the filter noise is not similar to the similar assumed abnormal noise and taps (selects) a button indicating that fact, the processing module 28 recognizes that fact (step S220). In this case, the processing module 28 performs the processing of step S240 described above, and this routine is terminated.

In the embodiment of the abnormal noise diagnosis support system 10 described above, the processing module 28 of the portable terminal 20 superimposes the assumed frequency of the abnormal noise for each assumed location of the diagnosis target same type on the recorded image of the entire engine room of the diagnosis target vehicle V, and causes the display 21 to display the superimposed image. When the operator selects any one of the assumed locations, the processing module 28 causes the display 21 to display the list of the sound files of the assumed abnormal noise for that assumed location. When the operator selects any one of the sound files for the assumed abnormal noise, the processing module 28 plays back the sound file for that assumed abnormal noise and causes the speaker 22 to output that assumed abnormal noise. The display 21 displays not only the plurality of assumed locations, but also the assumed frequency of the abnormal noise (ease of occurrence of abnormal noise) for each assumed location. Thus, the operator can select the assumed location (playback assumed location) for playback of the assumed abnormal noise by referring to the assumed frequency, and can play back the assumed abnormal noise at the selected playback assumed location. As a result, the operator can easily search for the similar assumed abnormal noise (similar assumed abnormal noise) that is similar to the abnormal noise (raw abnormal noise) occurred in the diagnosis target vehicle V. In other words, the abnormal noise diagnosis support system 10 can more fully support the operator in searching for the similar assumed abnormal noise.

In the embodiment of the abnormal noise diagnosis support system 10, when the operator selects the similar assumed abnormal noise, the processing module 28 applies the predetermined filter processing to the recorded sound of the predetermined location in the engine room of the diagnosis target vehicle V to generate the filtered noise, and plays back the generated filtered noise and causes the speaker 22 to output the filtered noise. Here, the predetermined location is a location that is the same as the assumed location corresponding to the similar assumed abnormal noise in the diagnosis target same type among each location in the engine room of the diagnosis target vehicle V. The predetermined filter processing is a filter processing that is the same as the filter processing applied to generate the similar assumed abnormal noise in the diagnosis target same type. This process allows the operator to compare the filtered noise and the assumed abnormal noise (similar assumed abnormal noise) and determine whether they are similar to each other or not. Since the filtered noise and similar assumed abnormal noise are subjected to the same filtering process when they are generated, the operator can more easily determine whether they are similar to each other or not.

In the embodiment, after the processing of step S170, when the operator determines that similar assumed abnormal noise exists and the processing module 28 recognizes it, the following processing is performed. When the operator determines that the filtered noise is similar to the similar assumed abnormal noise and the processing module 28 recognizes it (step S220), the processing module 28 causes the display 21 to display the cause of the abnormal noise and/or the method of dealing with the abnormal noise (method of eliminating the abnormal noise), corresponding to the sound file of the similar assumed abnormal noise (step S230). However, after the processing of step S170, when the operator determines that similar assumed abnormal noise exists and the processing module 28 recognizes it, the processing module 28 may immediately cause the display 21 to display the cause of the abnormal noise and/or the method of dealing with the abnormal noise, corresponding to the sound file of the similar assumed abnormal noise without executing steps S190-S220.

In the embodiment, the processing module 28 superimposes the assumed frequency of the abnormal noise for each assumed location of the diagnosis target same type on the recorded image of the entire engine room of the diagnosis target vehicle V, and causes the display 21 to display the superimposed image (step S140). However, processing module 28 may estimate the location of occurrence of the abnormal noise in the diagnosis target vehicle V by the artificial intelligence (AI) based on the recorded sound of each part of the engine room of the diagnosis target vehicle V, and may superimpose the assumed frequency of the abnormal noise at the assumed location around the location of the estimated occurrence on the recorded image of the entire engine room of the diagnosis target vehicle V, and may cause the display 21 to display the superimposed image. Here, the artificial intelligence estimates the location of occurrence of the abnormal noise by applying the recorded sound for each location to a learned model that relates the sound for each location in the engine room of the diagnosis target same type to the location of occurrence of the abnormal noise. Here, the artificial intelligence estimates the location of occurrence of the abnormal noise by applying the recorded sound for each location to a learned model that relates the sound for each location in the engine room of the diagnosis target same type to the location of occurrence of the abnormal noise. In this case, "around the location of occurrence" means within a predetermined range centered on the location of occurrence. This process limits the number of the assumed locations displayed on the display 21, thus the operator can easily search for the assumed abnormal noise (similar assumed abnormal noise) that is similar to the abnormal noise occurred in the diagnosis target vehicle V.

In the embodiment, the abnormal noise diagnosis support system 10 includes a portable terminal 20. However, the abnormal noise diagnosis support system 10 may also include the portable terminal 20 and a server 40. In this case, in the abnormal noise diagnosis support application shown in FIG. 2, the process of generating filtered noise in step S200 and the process of estimating the cause of the abnormal noise and/or the method of dealing with the abnormal noise by the artificial intelligence in step S240 may be performed by the server 40 instead of being performed by the processing module 28 of the portable terminal 20.

The following describes the correspondence relationship between the primary elements of the above embodiment and the primary elements of the disclosure described in Summary. In the embodiment, the acquisition module 26 corresponds to the "acquisition module" and the processing module 28 corresponds to the "processing module. The recording module 27 corresponds to the "recording module".

The correspondence between the major elements of the embodiment and the major elements of the disclosure described above is an example of how the embodiment can be used to specifically explain the embodiment of the disclosure described above. This does not limit the elements of the disclosure described above. In other words, interpretation of the disclosure described above should be based on the description in that section, and the embodiment is only one specific example of the disclosure described above.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

The technology of the present disclosure is applicable to the manufacturing industry of the abnormal noise diagnosis support system and other applications.

The invention claimed is:

1. An abnormal noise diagnosis support system configured to assist a user in diagnosing an abnormal noise of a diagnosis target vehicle, the system comprising:

an acquisition module configured to acquire a plurality of assumed locations of the abnormal noise in the diagnosis target vehicle, at least one assumed abnormal noise at each of the assumed locations, and an assumed frequency of the abnormal noise at each of the assumed locations, and a processing module programmed to superimpose the assumed frequency for each of the assumed locations on an image of the diagnosis target vehicle and to cause a display module to display the superimposed image, and programmed to play back the assumed abnormal noise corresponding to a selected assumed location and to cause a noise output module to output the assumed abnormal noise played back when the user selects any one of the assumed locations.

2. The abnormal noise diagnosis support system according to claim 1, wherein the assumed abnormal noise of the diagnosis target vehicle is an abnormal noise obtained by filter processing on a previously detected abnormal noise previously detected in a diagnosis target vehicle of a same type, which has the same vehicle type and powertrain type as the diagnosis target vehicle.

3. The abnormal noise diagnosis support system according to claim 2, wherein when the user indicates that the abnormal noise occurred in the diagnosis target vehicle and the assumed abnormal noise played back are similar to each other, the processing module is programmed to cause the display module to display a cause of the abnormal noise and/or a method of dealing with the abnormal noise, corresponding to the assumed abnormal noise played back.

4. The abnormal noise diagnosis support system according to claim 2, further comprising a recording module configured to record sounds as recorded sounds, for each part of the diagnosis target vehicle, wherein when the user selects any one of the assumed abnormal noises, the processing module is programmed to generate a filtered noise by applying the same filter processing as that applied in generating the selected assumed abnormal noise to the recorded sound of the same assumed location corresponding to the selected assumed abnormal noise among the various locations in the diagnosis target vehicle, to play back the filtered noise, and to cause the noise output module to output the filtered noise played back.

5. The abnormal noise diagnosis support system according to claim 4, wherein when the user indicates that the filtered noise and the selected assumed abnormal noise are similar to each other, the processing module is programmed to cause the display module to display a cause of the abnormal noise and/or a method of dealing with the abnormal noise, corresponding to the selected assumed abnormal noise.

6. The abnormal noise diagnosis support system according to claim 1, further comprising a recording module configured to record sounds as recorded sounds, for each part of the diagnosis target vehicle, wherein the processing module is programmed to estimate the location of occurrence of the abnormal noise in the diagnosis target vehicle by artificial intelligence based on the recorded sound for each part in the diagnosis target vehicle, to cause the display module to display the assumed frequency at the assumed location around the estimated location of occurrence of the abnormal noise.

* * * * *